United States Patent [19]
McMillan

[11] Patent Number: 5,826,267
[45] Date of Patent: Oct. 20, 1998

[54] WEB INFORMATION KIOSK

[76] Inventor: James Michael McMillan, 35 River Dr. #1507, Jersey City, N.J. 07310

[21] Appl. No.: 619,904

[22] Filed: Mar. 20, 1996

[51] Int. Cl.$^6$ .................................................. G06F 17/30
[52] U.S. Cl. .......................................... 707/9; 395/200.55
[58] Field of Search ..................... 395/200.09, 200.79, 395/200.48, 610, 603, 187.01, 200.55; 707/9

[56] References Cited

U.S. PATENT DOCUMENTS

| | | | |
|---|---|---|---|
| 5,491,820 | 2/1996 | Belove et al. | 707/3 |
| 5,530,852 | 6/1996 | Meske et al. | 395/200.36 |
| 5,572,643 | 11/1996 | Judson | 395/200.48 |
| 5,625,781 | 4/1997 | Cline et al. | 345/335 |
| 5,649,186 | 7/1997 | Ferguson | 707/10 |
| 5,678,041 | 10/1997 | Baker et al. | 707/9 |
| 5,696,898 | 12/1997 | Baker et al. | 395/187.01 |
| 5,748,889 | 5/1998 | Weinblatt et al. | 395/187.01 |

OTHER PUBLICATIONS

Hiraiwa et al.; "Info–Plaza: A Social Information Filtering System for the World–Wide Web"; Parallel and Distributed Systems, 1996 Int'l Conf.; p. 15, Jun. 1996.

Pazzani et al.; "Learning from Hotlists and Coldlists: Towards a WWW Information Filtering and Seeking Agent"; Tools with Arificial Intelligence, 1995 Int'l Conf.; pp. 492–495, 1995.

H. Maurer; "The A.E.I.O.U. Hypermedia Project"; Computer Animation, 1994 Proceedings; pp. 192–196, 1994.

Davis et al; "The Open Hypermedia Approach to Information Organisation"; IEE Colloq. (1995) No. 223; pp. 7/1–7/4, 1995.

Sheth et al.; "Evolving Agents for Personalized Information Filtering"; Artificial Intelligence Applications, 1993 Conf.; pp. 345–352.

*Primary Examiner*—Parshotam S. Lall
*Assistant Examiner*—Kenneth R. Coulter
*Attorney, Agent, or Firm*—Graybeal Jackson Haley LLP

[57] ABSTRACT

In general the present invention is an information kiosk which provides selective access to the World Wide Web in high traffic areas. Airports, shopping malls, and transportation terminals are among some of the locations envisioned for Web Information Kiosks. The kiosks regulate access to and make the World Wide Web easier and less intimidating to use by focussing the content they provide based upon the location of the Kiosk.

22 Claims, 3 Drawing Sheets

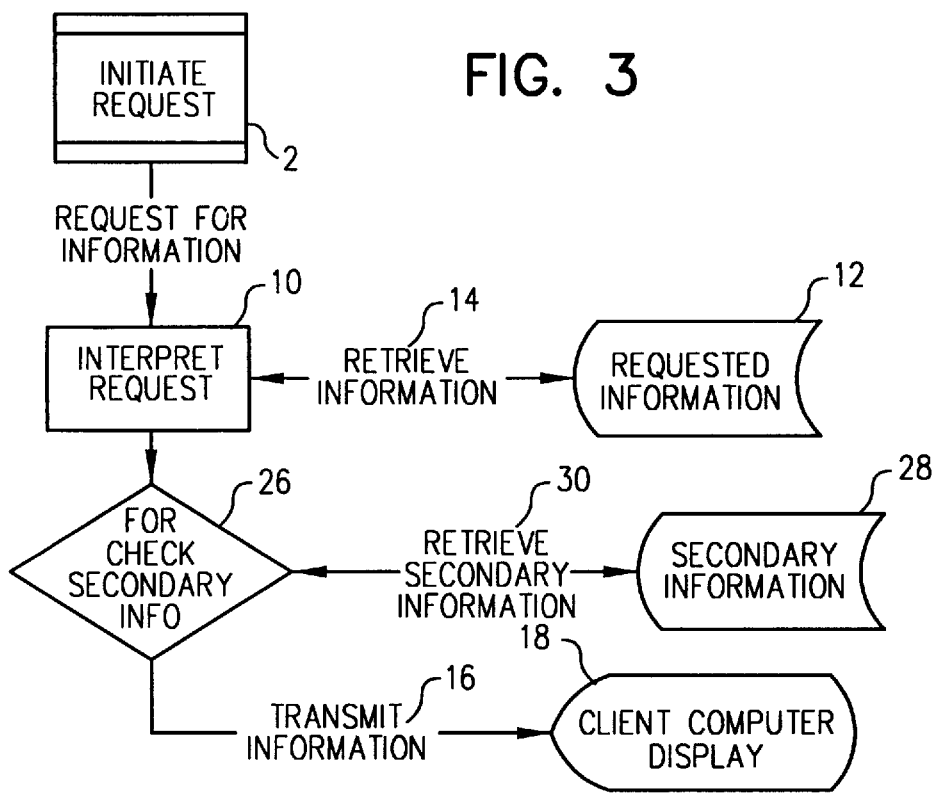

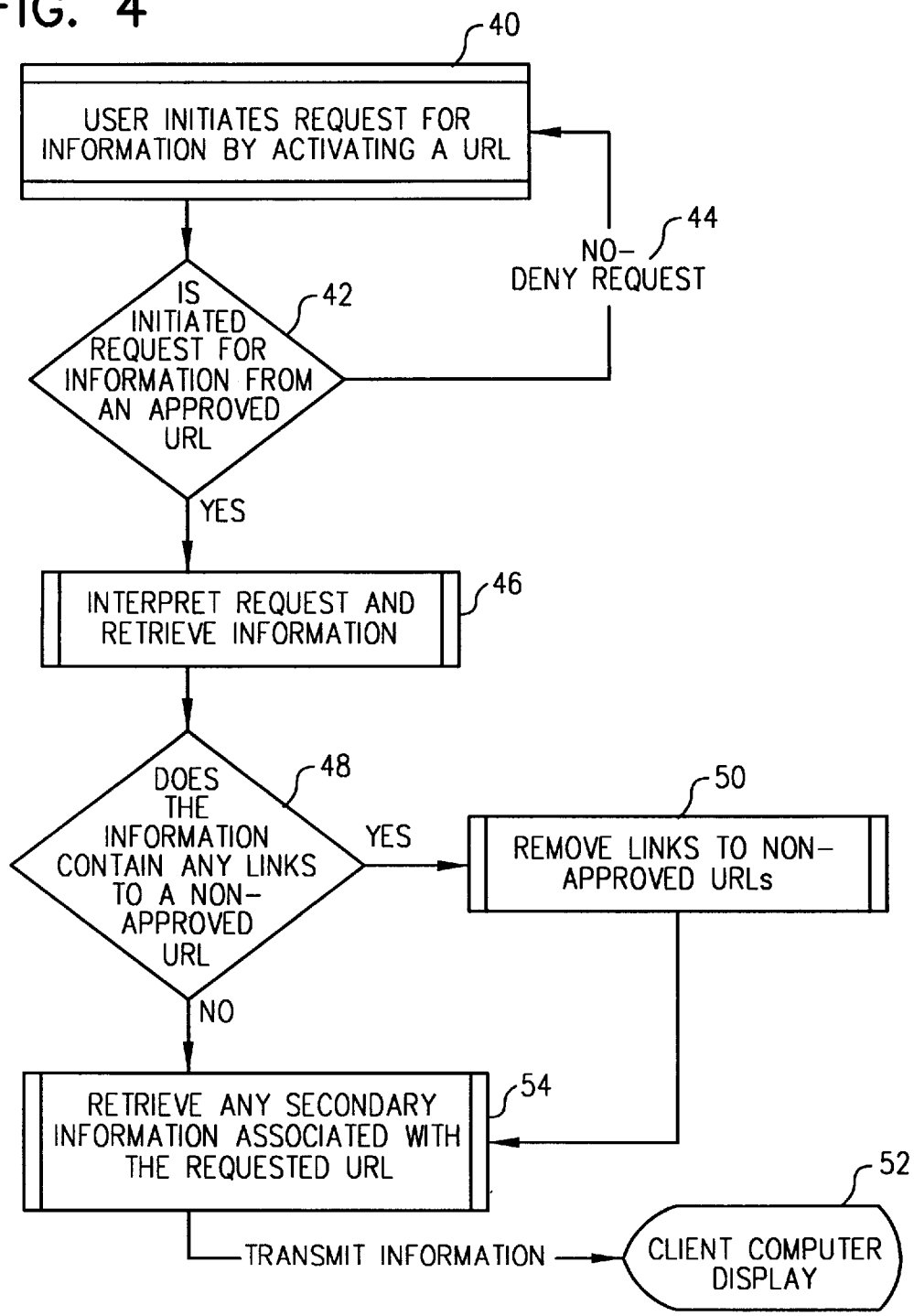

WEB INFORMATION KIOSK

FIELD OF THE INVENTION

The present invention relates generally to a method for selectively displaying and modifying hypertext documents on an electronic display, and more particularly to a method for selectively filtering, modifying, and displaying hypertext documents which are available on the World Wide Web as part of the Internet.

BACKGROUND OF THE INVENTION

A portion of the international network of computers collectively referred to as the Internet is organized into the World Wide Web (WWW). The Internet is a cooperatively run, globally distributed collection of computer networks that exchange information via the TCP/IP protocol. The World Wide Web is a hypertext information and communication system popularly used on the Internet computer network with data communications operating according to a client/server model.

Web clients, also refereed to as browsers, can access multiprotocol and hypermedia information, hypertext documents most commonly written in HTML, using an addressing scheme. URLs are the scheme by which Internet resources are addressed on the WWW. Transmission Control Protocol/Internet Protocol (TCP/IP)is the basic communication protocol that is the foundation of the Internet and all other protocols are built on top of TCP/IP. Uniform Resource Locators (URLs) can point to numerous resources on the Internet, including HTML documents, pictures, sound files, movie files, or even database search engines. URLs can point to resources located on the client computer, the server computer, or anywhere on the Internet. They can be accessed either through an HTTP server or another Internet server running on top of TCP/IP. The URL may also direct the server computer to run another gateway program and return the result to the client computer.

Hyper Text Markup Language (HTML), a type of Standardized General Markup Language (SGML), is the language used to prepare hypertext documents. Hypertext documents are distributed on the World Wide Web and are what the computer user actually sees on his client computer display. HTML commands, called "tags", mark text as headings, paragraphs, lists, quotations, emphasized, and other formatting information. HTML also has tags for including images within the documents, fill-in forms that accept user input, and most importantly, hypertext links connecting the document being read to other documents or Internet resources such as FTP sites, WAIS databases, USENET news, e-mail, Gopher sites, or another HTML document. This feature allows the user to click on a string of highlighted text and access a new document, an image, or a sound file from a computer hundreds, if not thousands, of miles away. The Hyper Text Markup Language document specifies where this document is through a Universal Record Locator, which is included in the HTML markup instructions and which is used by the browser to find the designated resource on the Internet.

The element marking a hypertext link in a Hyper Text Markup Language document is referred to as an "anchor" or "element" and the marked text is referred to as a "hypertext anchor".

Hyper Text Transfer Protocol (HTTP) is an Internet protocol designed expressly for the rapid distribution of hypertext documents. Like other Internet tools, such as FTP, WAIS, and Gopher, HTTP is a client/server protocol. In the client-server model, a client program running on the user's machine sends a message requesting service to a server program running on a another machine on the Internet. The server responds to the request by sending a message back to the client. In exchanging these messages, the client and server use a well understood protocol. FTP, WAIS, and Gopher are also Internet client/server protocols and all of these protocols are accessible to a World Wide Web Browser. The HTTP protocol is designed specifically for hypertext document delivery and therefore will constitute the most common type of protocol on the WWW. All of these protocols, FTP, WAIS, Gopher, HTTP, and even the newer protocols including VRML and Java are built on top of the TCP/IP protocol.

At the simplest level, HTTP servers act much like anonymous FTP servers, delivering files when clients request them. However, HTTP servers support additional features which distinguish them from other Internet servers. One distinguishing feature is the ability to return to the client not just files, but also information generated by programs running on the server. Another distinguishing feature is the ability to take data sent from the client and pass this information on to the programs running on the server for further processing and then return the results when the processing is completed. These special server side programs are called gateway programs, because they act as a gateway between the HTTP server and other local resources. Interaction between the server and the gateway programs is governed by the Common Gateway Interface (CGI) specifications.

HTTP is a stateless protocol, which means that a client can make several requests of a server, but each request is treated independently, with the server having no memory of previous connections. The statelessness results in the rapid and efficient delivery of hypertext documents. There are four stages in an HTTP connection. First, the connection is opened. This means the client computer contacts the server at the Internet address and port number specified in the URL. Second, the client sends a message to the server, requesting service. The request consists of HTTP request headers that define the "method" requested for the transaction and provide information about the capabilities of the client, followed by the data being sent to the server. Typical HTTP methods are GET, for getting an object from a server, or POST, for posting data to an object on the server. Third, the server sends a response to the client. This consists of response headers describing the state of the transaction, followed by the actual data. Fourth, the connection is closed. This procedure means that a connection can download only a single document or process a single transaction while the stateless nature of the transaction means that each connection knows nothing about previous connections.

SUMMARY OF THE INVENTION

The Web information kiosk system of the present invention filters URLs and provides access only to hypertext documents which have been previously authorized. This aspect of the invention allows for control of what will be available at the Web information kiosks. It regulates the mixture of commercial and non-commercial hypertext documents. Commercial hypertext documents are the Web pages of subscribing businesses which want their hypertext documents to be available in the areas in which the kiosks are placed. The filtering system also focuses the available information so as to make it more useful for the casual user. The filtering system allows advertisers such as hotels, restaurants, and other business that want a home page to be accessible in the high traffic areas in which the kiosks are placed to target their hypertext documents to specific regions. This can be accomplished by authorizing hypertext pages to be displayed only on certain Web information kiosks. Non-commercial hypertext documents are the pre-selected pages which provide information such as movie schedules, weather and traffic information sports scores, and any other hypertext documents used to attract people as they pass.

Another aspect of the present invention is a Web information kiosk which modifies the HTML of a hypertext document by removing hyperlink anchors to unauthorized hypertext documents. This aspect of the invention works in conjunction with the filtering system to 1) prevent access to unauthorized hypertext documents and 2) make the system easier to tse by removing links to hypertext documents which cannot be accessed from the kiosk. Preventing links that can not be accessed from the kiosk from ever being displayed reduces user frustration at the inability to access a hypertext document.

Yet another aspect of the present invention is a Web information kiosk which provides additional information in a secondary window when predefined URLs are selected. This aspect of the invention allows the owner of the kiosk to display in a second window supplemental information which may be related to a hypertext document but which is not a part of the document itself. One or more supplemental information windows may be available for a given home page. An example of this may be a local map which shows the location of the kiosk in relationship to the business whose Web page, hypertext document, is being displayed. The supplemental information windows may also display randomly or in a preset order advertisements, with hypertext links, for the subscribing businesses Web pages accessible at a particular kiosk. The content of the secondary information window may be dependent upon the geographical location of the client computer from which the Web page, hypertext document, is being viewed.

An additional interface feature of the present invention is a hypertext document starting point which provides travelers with information not only about where they are but also allows them to navigate the information available about their destination. The information about a given destination or other location is organized the same way so the system would quickly become familiar to the user and easy to use.

These and other features of the present invention will be more fully appreciated when considered in light of the following detailed description and drawings.

BRIEF DESCRIPTION OF THE DRAWINGS

FIG. 3 is a schematic illustration of the secondary information display aspect of the present invention.

FIG. 4 is a schematic illustration of one embodiment of the Web information kiosk of the present invention.

DETAILED DESCRIPTION OF THE INVENTION

Figure 1:
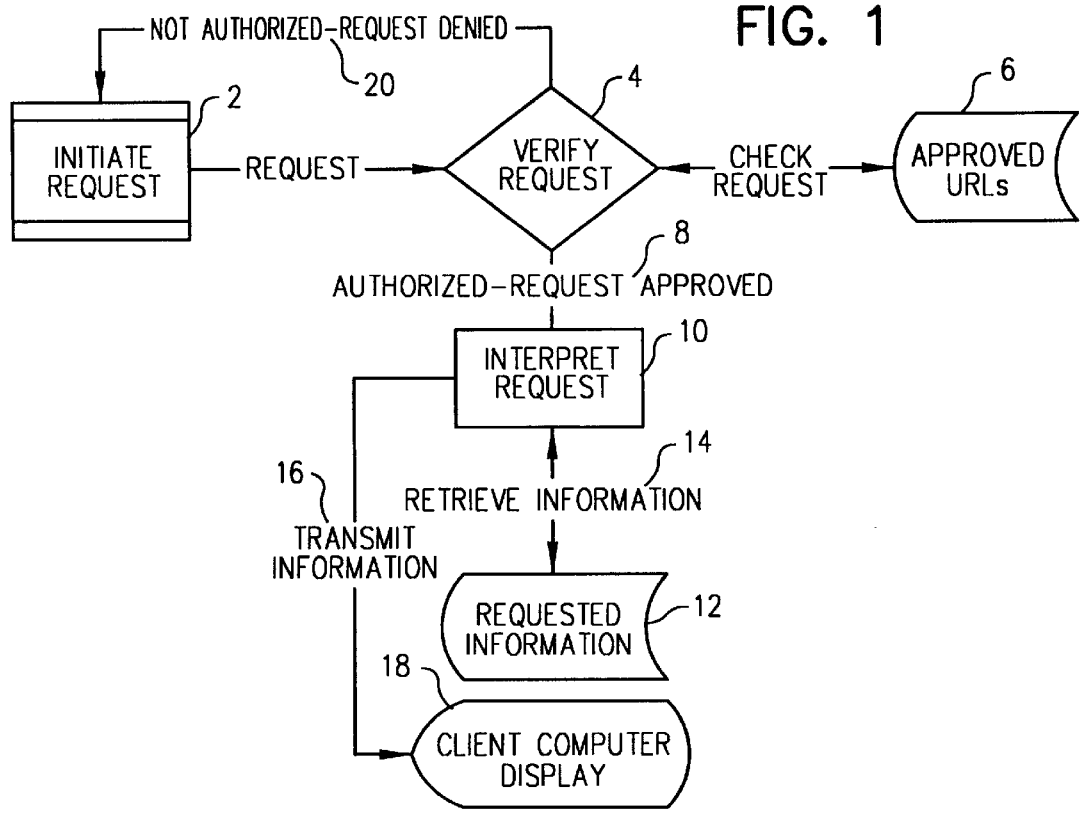
FIG. 1 is a schematic illustration of the URL filtering aspect of the present invention.

FIG. 1 illustrates the URL filtering feature of the present invention. The user initiates a request 2 for information on a client computer directed towards a server utilizing the HTTP protocol. This request for information usually takes the form of clicking on a hypertext anchor within a hypertext document displayed on a computer display associated with the client computer. The request for information is then verified 4 to see if the URL requested is from the approved list of URLs 6 previously stored in the computer. If it is, the request is authorized 8 and then interpreted 10, the requested information 12 is retrieved 14, and transmitted 16 to the client computer, where the HTML is compiled into a hypertext document and displayed 18. If the URL is not on the approved URL list 6, the request for information is denied and the user is prompted to re-enter a request for information, click on another URL.

Figure 2:
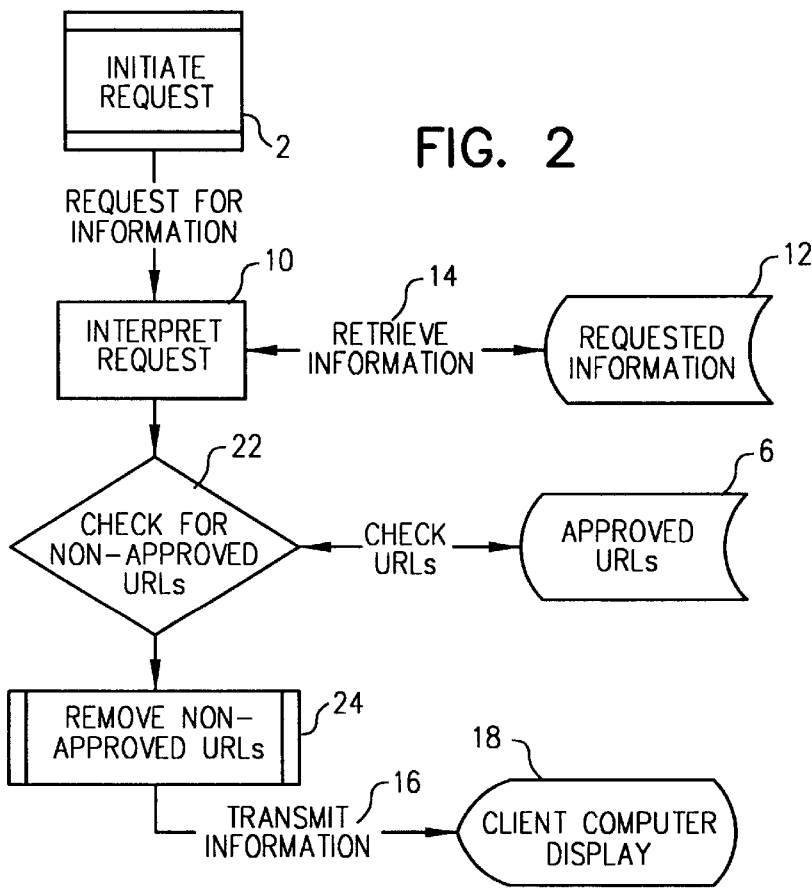
FIG. 2 is a schematic illustration of the hypertext link modifying aspect of the present invention.

FIG. 2 illustrates the hypertext link modifying feature of the present invention. An individual using the client computer initiates a request for information 2, again most likely in the form of clicking on a hypertext anchor associated with a URL. The request for information is interpreted 10 and the information is retrieved 14. If the requested information 12 is an HTML document, it is checked 22 to see if it contains hypertext anchors to non-approved URLs by comparing the hypertext anchors in the requested information 12 to a list of approved URLs 6. If the hypertext markup language document retrieved does not contain any non-approved URLs, it is transmitted 16 to the client computer and displayed 18. If the retrieved hypertext markup language document does contain non-approved URLS, the non-approved URLs are removed 24 from the document before it is transmitted 16 to the client computer and displayed 18.

When an individual requests information in the form of clicking on a hypertext anchor, that transmission will retrieve whatever document is associated with that anchor. If the document contains a hypertext markup language command directing it towards a URL that is not approved, the hypertext anchor pointing towards the non-approved URL is removed before it is displayed to the individual using the client computer. This prevents the user of the client computer from attempting to access hypertext documents which have not been approved for display.

FIG. 3 illustrates the secondary information display window feature of the present invention. A user initiates a request 2 for information on a client computer. That information request is then transferred to a server computer which interprets the request 10 and retrieves 14 the requested information 12. Prior to displaying the requested information on the client computer display 18, either the server computer or the client computer may check 26 to see if secondary information 28 is available for display with the requested information based upon the location of the client computer.

If secondary information 28 is available, it is retrieved 30 and displayed 18 along with the requested information. The secondary information 28 may either be integrated into the requested hypertext document or displayed in a secondary information window.

An example of the use of this feature would be a user requesting information regarding a particular hotel. The server retrieves the information regarding the hotel and transmits it to the client computer. The client computer then compares the document retrieved with its list of secondary information to be displayed and, based upon the location of the client computer and the document retrieved, could provide secondary information including such things as directions from the present location of the client computer, the user's current location, to the hotel, information about cab and bus fares, or alternate methods of transportation.

The secondary information window may also make available other hypertext documents which might allow the user to schedule a shuttle bus pickup or hail a cab electronically.

FIG. 4 illustrates one embodiment of the Web information kiosk system utilizing all of the previously discussed features. A user initiates a request 40 for information by activating a URL in a hypertext document. This request is then checked 42 to see if it is initiating a request for information from an approved URL. If the request for information is not from an approved URL, the request is denied. If the request for information is from an approved URL, the request is then interpreted and the information retrieved 46. After retrieving the requested information, it is then checked 48 to see if the Hyper Text Markup Language document which has been retrieved contains any non-approved hypertext anchors to non-approved URLs. If the retrieved hypertext document does contain any anchors to non-approved URLs, those anchors are removed 50 prior to displaying the document on the client computer's display 52. The retrieved document is then checked 54 to see if any secondary information is associated with the requested document. If any secondary information is associated with the requested document, it is transmitted along with the requested document to the client computer and is then displayed along with the requested document on the client computer display, either by integrating the supplementary information into the requested hypertext document or displaying it in a secondary information window.

From the foregoing teachings, it can be appreciated that a new, novel, and nonobvious method for selectively displaying hypertext information has been disclosed. It is to be understood that numerous alternatives and equivalents will be apparent to those of ordinary skill in the art, given the teachings herein, such that the present invention is not to be limited by the foregoing description but only by the appended claims.

I claim:

1. A method for selectively displaying hypertext documents to a user by an operator on an electronic display associated with a client computer connected to a server computer through a data network comprising the steps of:
   a) initiating a user request for the transfer of information from a server computer through a client computer by specifying to said server computer a Uniform Resource Locator;
   b) verifying that said Universal Resource Locator is from a group of previously operator approved Uniform Resource Locators;
   c) interpreting said request for the transfer of information if said Uniform Resource Locator is from said group of previously operator approved Uniform Resource Locators;
   d) transmitting information associated with said Uniform Resource Locator to said client computer; and
   e) displaying said information to said user, wherein the step of displaying said information includes the substep of removing from said information Hyper Text Markup Language anchors which would initiate requests for information from said server computer by specifying Uniform Resource Locators which are not in said group of previously operator approved Uniform Resource Locators.

2. The method of claim 1 wherein the step of interpreting said request for the transfer of information includes the substep of instructing said server computer to run a server side program which acts as an interface between said server and other local resources associated with said Uniform Resource Locator.

3. The method of claim 1 wherein the step of displaying said information includes displaying a predefined secondary set of information based upon the location of said client computer.

4. The method of claim 3 wherein the step of displaying a predefined secondary set of information is based upon the time of day at said location of said client computer.

5. A method for selectively displaying hypertext documents to a user by an operator on an electronic display associated with a client computer connected to a server computer through a data network comprising the steps of:
   a) initiating a user request for the transfer of information from a server computer through a client computer by specifying to said server computer a Uniform Resource Locator;
   b) interpreting said user request for the transfer of information;
   c) transmitting information associated with said Uniform Resource Locator to said client computer;
   d) removing from said transmitted information Hyper Text Markup Language anchors which would initiate requests for information from said server computer by specifying Uniform Resource Locators which are not in a group of previously operator approved Uniform Resource Locators; and
   e) displaying said user request information without links associated with said anchors.

6. The method of claim 5 wherein the step of interpreting said request for the transfer of information includes the substep of instructing said server computer to run a server side program which acts as an interface between said server and other local resources associated with said Uniform Resource Locator.

7. The method of claim 5 wherein the step of displaying said information includes displaying a predefined secondary set of information based upon the location of said client computer.

8. The method of claim 7 wherein the step of displaying a predefined secondary set of information is based upon the time of day at said location of said client computer.

9. specifying Uniform Resource Locators which are not in a group of previously operator approved Uniform Resource Locators.

10. The method of claim 9 wherein the step of interpreting said request for the transfer of information includes the substep of instructing said server computer to run a server side program which acts as an interface between said server and other local resources associated with said Uniform Resource Locator.

11. The method of claim 9 wherein the step of displaying a predefined secondary set of information is based upon the time of day at said location of said client computer.

12. A computer readable storage medium encoded with executable instructions representing a computer program that can cause a computer for perform a method for selectively displaying hypertext documents to a user by an operator on an electronic display associated with a client computer connected to a server computer through a data network comprising the steps of:
   a) initiating a user request for the transfer of information from a server computer through a client computer by specifying to said server computer a Uniform Resource Locator;
   b) verifying that said Uniform Resource Locator is from a group of previously operator approved Uniform Resource Locators;

c) interpreting said user request for the transfer of information if said Uniform Resource Locator is from said group of previously approved Uniform Resource Locators;

d) transmitting information associated with said Uniform Resource Locator to said client computer; and e) displaying said information, wherein the step of displaying said information includes the substep of removing from said information Hyper Text Markup Language anchors which would initiate requests for information from said server computer by specifying Uniform Resource Locators which are not in said group of previously operator approved Uniform Resource Locators.

13. The computer readable storage medium of claim 12 wherein the method step of interpreting said user request for the transfer of information includes the substep of instructing said server computer to run a server side program which acts as an interface between said server and other local resources associated with said Uniform Resource Locator.

14. The computer readable storage medium of claim 12 wherein the method includes the step of displaying said information includes displaying a predefined secondary set of information based upon the location of said client computer.

15. The computer readable storage medium of claim 14 wherein the method includes the step of displaying a predefined secondary set of information is based upon the time of day at said location of said client computer.

16. The computer readable storage medium of claim 12 wherein the method step of displaying said information includes the substep of removing from said information Hyper Text Markup Language anchors which would initiate requests for information from said server computer by specifying Uniform Resource Locators which are not in said group of previously operator approved Uniform Resource Locators:

a) initiating a user request for the transfer of information from a server computer through a client computer by specifying to said server computer a Uniform Resource Locator;

b) interpreting said user request for the transfer of information;

c) transmitting information associated with said Uniform Resource Locator to said client computer;

d) removing from said transmitted information Hyper Text Markup Language anchors which would initiate requests for information from said server computer by specifying Uniform Resource Locators which are not in a group of previously operator approved Uniform Resource Locators; and e) displaying said user requested information without links associated with said anchors.

17. The computer readable storage medium of claim 16 wherein the method includes the step of interpreting said request for the transfer of information includes the substep of instructing said server computer to run a server side program which acts as an interface between said server and other local resources associated with said Uniform Resource Locator.

18. The computer readable storage medium of claim 16 wherein the method includes the step of displaying said information includes displaying a predefined secondary set of information based upon the location of said client computer.

19. The computer readable storage medium of claim 18 wherein the method includes the step of displaying a predefined secondary set of information is based upon the time of day at said location of said client computer.

20. The computer readable storage medium encoded with executable instructions representing a computer program that can cause a computer to perform a method for selectively displaying hypertext documents on an electronic display associated with a client computer connected to a server computer through a data network comprising the steps of:

a) initiating a user request for the transfer of information from a server computer through a client computer by specifying to said server computer a Uniform Resource Locator;

b) interpreting said user request for the transfer of information;

c) transmitting information associated with said Uniform Resource Locator to said client computer; and d) displaying said user requested information and displaying a predefined secondary set of information based upon the location of said client computer, wherein the method includes the step of displaying said information includes the substep of removing from said information Hyper Text Markup Language anchors which would initiate requests for information from said server computer by specifying Uniform Resource Locators which are not in a group of previously operator approved Uniform Resource Locators.

21. The computer readable storage medium of claim 20 wherein the method includes the step of interpreting said request for the transfer of information includes the substep of instructing said server computer to run a server side program which acts as an interface between said server and other local resources associated with said Uniform Resource Locator.

22. The computer readable storage medium of claim 20 wherein the method includes the step of displaying a predefined secondary set of information is based upon the time of day at said location of said client computer.

* * * * *

UNITED STATES PATENT AND TRADEMARK OFFICE
CERTIFICATE OF CORRECTION

PATENT NO. : 5,826,267
DATED : October 20, 1998
INVENTOR(S) : James Michael McMillan It is certified that error appears in the above-indentified patent and that said Letters Patent is hereby corrected as shown below:

Column 6, line 42, after "9." and before "specifying" please insert:

" A method for selectively displaying hypertext documents to a user by an operator on an electronic display associated with a client computer connected to a server computer through a data network comprising the steps of:

a) initiating a user request for the transfer of information from a server computer through a client computer by specifying to said server computer a Uniform Resource Locator;

b) interpreting said user request for the transfer of information;

c) transmitting information associated with said Uniform Resource Locator to said client computer; and d) displaying said information and displaying a predefined secondary set of information based upon the location of said client computer, wherein the step of displaying said information includes the substep of removing from said information Hyper Text Markup Language anchors which would initiate requests for information from said server computer by"

Signed and Sealed this

Twenty-first Day of September, 1999

Attest:

Q. TODD DICKINSON

Attesting Officer

Acting Commissioner of Patents and Trademarks